United States Patent
Kramer et al.

(10) Patent No.: US 9,150,714 B2
(45) Date of Patent: Oct. 6, 2015

(54) SULFUR-CROSSLINKABLE RUBBERIZING MIXTURE

(71) Applicant: Continental Reifen Deutschland GmbH, Hannover (DE)

(72) Inventors: Thomas Kramer, Herford (DE); Carla Recker, Hannover (DE); Thorsten Torbruegge, Langenhagen (DE); Marc Kreye, Braunschweig (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 14/185,604

(22) Filed: Feb. 20, 2014

(65) Prior Publication Data

US 2014/0171556 A1    Jun. 19, 2014

Related U.S. Application Data

(63) Continuation of application No. PCT/EP2012/065032, filed on Aug. 1, 2012.

(30) Foreign Application Priority Data

Sep. 9, 2011    (DE) .................. 10 2011 053 450

(51) Int. Cl.
*C08L 7/00*    (2006.01)
*C08K 3/36*    (2006.01)
*C08L 9/00*    (2006.01)

(52) U.S. Cl.
CPC ... *C08L 7/00* (2013.01); *C08K 3/36* (2013.01); *C08L 9/00* (2013.01)

(58) Field of Classification Search
CPC ............. C08L 7/00; B60C 1/00; B60C 13/00; C08K 3/34; C08K 5/541; C07F 7/08; C08F 136/06
USPC .................................................. 524/81, 526
See application file for complete search history.

(56) References Cited

U.S. PATENT DOCUMENTS

| 5,871,597 | A  | 2/1999  | Vasseur |
| 6,169,137 | B1 | 1/2001  | Vasseur |
| 6,465,544 | B1 | 10/2002 | Bomal et al. |
| 7,307,116 | B2 | 12/2007 | Mizuno et al. |
| 7,968,633 | B2 | 6/2011  | York et al. |
| 7,968,634 | B2 | 6/2011  | York et al. |
| 7,968,635 | B2 | 6/2011  | York et al. |
| 7,968,636 | B2 | 6/2011  | York et al. |
| 8,240,350 | B2 * | 8/2012 | Resmini et al. ............... 152/450 |
| 8,426,512 | B2 | 4/2013  | Zhang et al. |
| 2012/0157585 | A1 | 6/2012 | Makiuchi et al. |

FOREIGN PATENT DOCUMENTS

WO    WO 99/09036 A1    2/1999
WO    WO 2011/083048 A1    7/2011

OTHER PUBLICATIONS

International Search Report dated Dec. 11, 2012 of international application PCT/EP2012/065032 on which this application is based.
Datta R. et al, "Steel Cord Adhesion", KGK Kautschuk Gummi Kunststoffe 52, Jahrgang, No. 5/99, pp. 322 to 328, 1999.
Eisele, U. et al, "The Tear Analyzer—A New Tool for Quantitative Measurements of the Dynamic Crack Growth of Elastomers", Kautschuk + Gummi-Kunststoffe 45, Jahrgang, Nr. 12/92, pp. 1064 to 1069, 1992.
Neidermeier, W. et al, "Nano-Structure Blacks", KGK Kautschuk Gummi Kunststoffe 52, Jahrgang, No. 10/99, pp. 670 to 676, 1999.
Singh, B. et al, "Neue Haftvermittler aus vinylterminierten Carbamylmethyl-Melaminharzen", GAK 5, 1995-Jahrgang 48, pp. 536 to 541, 1995.

* cited by examiner

*Primary Examiner* — Robert Harlan
(74) *Attorney, Agent, or Firm* — Walter Ottesen P.A.

(57) ABSTRACT

A sulfur-crosslinkable rubberizing mixture for strengthening elements in motor vehicle pneumatic tires comprises 70 to 100 phr (parts by weight, based on 100 parts by weight of total rubbers in the mixture) of natural rubber, up to 30 phr of at least one polybutadiene, up to 15 phr of at least one carbon black, 20 to 100 phr of at least one high-dispersibility silica, at least one silane coupling agent and a bonding system. The invention further relates to motor vehicle pneumatic tires comprising the sulfur-crosslinked rubberizing mixture. For improved resistance to cracking and growth of cracks with good adhesion and good mechanical and dynamic properties, the high-dispersibility silica has a CTAB number to ASTM D 3765 of more than 130 m$^2$/g.

10 Claims, No Drawings

SULFUR-CROSSLINKABLE RUBBERIZING MIXTURE

CROSS REFERENCE TO RELATED APPLICATIONS

This application is a continuation application of international patent application PCT/EP2012/065032, filed Aug. 1, 2012, designating the United States and claiming priority from German application 10 2011 053 450.4, filed Sep. 9, 2011, and the entire content of both applications is incorporated herein by reference.

FIELD OF THE INVENTION

The invention relates to a sulfur-crosslinkable rubberizing mixture for reinforcement in pneumatic tires, comprising from 70 to 100 phr (parts by weight, based on 100 parts by weight of all of the rubbers in the mixture) of natural rubber, up to 30 phr of at least one polybutadiene, up to 15 phr of at least one carbon black, from 20 to 100 phr of at least one high-dispersibility silica, at least one silane coupling agent, and an adhesive system. The invention further relates to pneumatic tires which comprise the sulfur-crosslinked rubberizing mixture.

BACKGROUND OF THE INVENTION

The phr (parts per hundred parts of rubber by weight) data used in this specification are the conventional quantitative data used in the rubber industry for mixture formulations. The amount added in parts by weight of the individual components here is always based on 100 parts by weight of the entire composition of all of the rubbers present in the mixture.

Pneumatic tires are strengthened by textile or metallic reinforcement, e.g., brass-coated steel cord, in order to withstand high mechanical stresses. Pneumatic tires comprise by way of example brass-coated steel cord in the belt, in the bead core, and optionally in the carcass. In order to ensure that the rubber-reinforcement composite is durable, the embedding rubber mixture (rubberizing mixture) is intended to exhibit good adhesion to the reinforcement, and this adhesion should not be impaired by aging and by storage in moist conditions. The vulcanizates should moreover exhibit high dynamic and mechanical strength and low susceptibility to cracking and to crack propagation.

The adhesion of rubber to textile reinforcement is achieved by way of impregnation (e.g. with resorcinol-formaldehyde resins in combination with rubber latices (RFL dip)) by the direct method using adhesive mixtures or by way of adhesive solutions of unvulcanized rubber using polyisocyanates.

The rubber-metal adhesion can be advantageously influenced by use of what are known as reinforcing resins in the rubberizing mixture. Examples of known reinforcing resins are lignin, polymer resins, and phenol-formaldehyde resins with hardener. A method that has long been known for improving the rubber-metal adhesion is to use cobalt salts and/or a resorcinol-formaldehyde-silica system, or a resorcinol-formaldehyde system as additions for the rubberizing mixtures. Rubberizing mixtures with cobalt salts and with a resorcinol-formaldehyde-silica system are known by way of example from KGK Kautschuk Gummi Kunststoffe No. 5/99, pp. 322 to 328, from GAK 8/1995, p. 536, and from U.S. Pat. No. 7,307,116.

Fillers used in known rubberizing mixtures are carbon black and/or silica in the following carbon-black-to-silica ratios: from 100:0 to 80:20, or else from 20:80 to 0:100.

Sulfur-crosslinkable rubberizing mixtures are known from U.S. Pat. Nos. 5,871,597 and 6,169,137. In those documents they are used by way of example as rubberizing mixtures for the belt. The intention there is to reduce the rolling resistance of the tire without impairing the other properties such as adhesion, wear resistance, and durability, in particular of the belt, and without impairing the production of the tire. The expression high-dispersibility silica here means a silica which can break up or deagglomerate and which therefore can be dispersed (distributed) particularly well and uniformly in an elastomer matrix. The particularly good distribution can be demonstrated via electron micrographs or optical micrographs of thin layers. The silicas Ultrasil® VN2 and Ultrasil® VN3 marketed by Evonik Industries are not high-dispersibility silicas. The use of high-dispersibility silica is intended to reduce materials fatigue to a minimum in the vulcanized mixture and thus reduce the risk of separation of the mixture from reinforcement. The CTAB index of the high-dispersibility silicas used in U.S. Pat. Nos. 5,871,597 and 6,169,137 is $\leq 125$ m$^2$/g.

SUMMARY OF THE INVENTION

The present invention is based on the object of providing rubberizing mixtures which can be used for reinforcement in pneumatic tires and which feature improved resistance to cracking and to crack propagation at the same time as good adhesion and good mechanical and dynamic properties. The intention is thus to improve the lifetime of pneumatic tires.

The invention achieves the object in that the CTAB index of the high-dispersibility silica in accordance with ASTM D3765 is more than 130 m$^2$/g.

Surprisingly, it has been found that use of high-dispersibility silicas with a high CTAB index, i.e., with a large specific surface area without the pores, into which cetyltrimethylammonium bromide does not pass, can markedly improve the rate of cracking and of crack propagation. Tires using a rubberizing mixture of the invention by way of example as rubberizing mixture for the belt thus obtain a markedly increased lifetime.

The rubberizing mixture comprises from 70 to 100 phr of natural rubber (NR), this being a polyisoprene synthesized biochemically in plants with more than 99% cis-1,4 content.

The rubberizing mixture comprises, as further rubber, up to 30 phr, preferably from 15 to 25 phr, of at least one polybutadiene (BR). For particularly good adhesion properties and good processing behavior, the polybutadiene is one having more than 95% by weight cis content or a functionalized Li-polybutadiene, e.g. BR1250 H from Nippon Zeon or functionalized polybutadienes of the type described in U.S. Pat. No. 8,426,512.

The rubberizing mixture of the invention can comprise up to 15 phr of at least one carbon black. Accordingly, it can also, however, be entirely free from carbon black. Types of carbon black that can be used are those conventionally used for rubberizing mixtures, for example carbon black of type N 326.

The rubberizing mixture comprises from 20 to 100 phr, preferably from 40 to 80 phr, of at least one high-dispersibility silica with a CTAB index of more than 130 m$^2$/g. Accordingly, it is also possible, however, that a plurality of these silicas are present alongside one another in the mixture. In this application, the expression high-dispersibility silicas covers silicas which the person skilled in the art knows to be capable of good and uniform dispersion in the elastomer matrix. They are marketed as what are known as HD silicas, e.g., Ultrasil® 7000 from Evonik Industries or Zeosil® 1165

MP from Rhodia. They exhibit markedly improved structural stability on exposure to external forces, and are therefore capable of good distribution in the mixture.

In order to improve processability, and for the coupling of the silica and of other polar fillers optionally present to the diene rubber, silane coupling agents are used in the rubberizing mixture. The silane coupling agents react with the superficial silanol groups of the silica during the mixing of the rubber or of the rubber mixture (in situ), or in the context of a pretreatment (premodification) before the addition of the filler to the rubber. Silane coupling agents that can be used here are any of the silane coupling agents known to the person skilled in the art for use in rubber mixtures. Coupling agents of this type known from the prior art are bifunctional organosilanes which have at least one alkoxy, cycloalkoxy, or phenoxy group as leaving group on the silicon atom and which have, as other functionality, a group which optionally after a cleavage process can enter into a chemical reaction with the double bonds of the polymer. The last-mentioned group can by way of example be the following chemical groups: —SCN, —SH, —NH$_2$, or —S$_x$— (where x=from 2 to 8). It is therefore possible to use, as silane coupling agents, by way of example, 3-mercapto-propyltriethoxysilane, 3-thiocyanatopropyltrimethoxy-silane, or 3,3'-bis(triethoxysilylpropyl)polysulfides having from 2 to 8 sulfur atoms, for example 3,3'-bis(triethoxysilylpropyl)tetrasulfide (TESPT), the corresponding disulfide, or else a mixture of the sulfides having from 1 to 8 sulfur atoms with various contents of the various sulfides. It is also possible here by way of example to add TESPT in the form of a mixture with industrial carbon black (trade name X50S from Evonik Industries). Blocked mercaptosilanes, such as those known from WO 99/09036, can also be used as silane coupling agent. It is also possible to use silanes such as those described in U.S. Pat. Nos. 7,968,633; 7,968,636; 7,968,635; and, 7,968,634. It is possible to use by way of example silanes marketed by Momentive Performance Materials, USA, in various variants as NXT, or silanes marketed as VP Si 363 by Evonik Industries.

The rubberizing mixture can also comprise, alongside carbon black and the high-dispersibility silicas, other fillers, for example other silicas, aluminosilicates, chalk, starch, magnesium oxide, titanium dioxide, or rubber gels.

The rubberizing mixture of the invention comprises an adhesive system. Use of either an adhesive system for rubber-textile adhesion or an adhesive system for rubber-metal adhesion depends on whether the rubber mixture is to be used for textile or metallic reinforcement.

In a preferred embodiment of the invention, the reinforcement is metallic reinforcement. The improvement of adhesion and of cracking behavior has a particularly advantageous effect in the case of metallic reinforcement, since in the event of loss of adhesion and of cracking this has increased exposure to corrosion, with resultant severe impairment of the lifetime of the pneumatic tire.

If the rubberizing mixture is used for rubberizing metallic reinforcement, in particular steel cord, it is preferable to use a steel cord adhesion system based on organic cobalt salts and on reinforcing resins, and more than 2.5 phr of sulfur.

The amounts used of the organic cobalt salts are usually from 0.2 to 2 phr. Examples of cobalt salts that can be used are cobalt stearate, borate, borate alkanoates, naphthenate, rhodinate, octanoate, adipate, etc. Reinforcing resins that can be used are resorcinol-formaldehyde resins, such as resorcinol-hexamethoxymethylmelamine resins (HMMM), or resorcinol-hexamethylenetetramine resins (HEXA), or modified phenolic resins, for example Alnovol® products. It is also possible to use the precondensates of the resorcinol resins.

In an advantageous embodiment of the invention, the rubberizing mixture comprises less than 15 phr of processing aids, where this means oils and other viscosity-lowering substances. The processing aids can by way of example be plasticizing oils or plasticizing resins. It has been found that the amount of processing aids added to improve mixing, extrusion, and calendering of the mixture can be reduced greatly in comparison with conventional mixtures, and that the mixtures of the invention nevertheless exhibit good processing behavior at moderate viscosity, and that the vulcanizates have good dynamic-mechanical properties.

The rubber mixture can comprise, as other additions, conventional parts by weight of other conventional additional substances, for example vulcanization accelerators, vulcanization retarders, zinc oxide, and antioxidants.

The production of the rubberizing mixture of the invention is achieved conventionally, by first generally producing a parent mixture which comprises all of the constituents except for the vulcanization system (sulfur and substances affecting vulcanization) in one or more mixing stages, and then producing the finished mixture by adding the vulcanization system. The mixture is then further processed.

The rubberizing mixture can be used for rubberizing a very wide variety of tire components, for example the bead core, the bead coverings, the belt, the carcass, or the bracing bandages, and it is also possible here that a plurality of components within a tire are provided, i.e. generally calendered, with the mixture of the invention.

A particularly long extension of the lifetime of pneumatic tires can be achieved when the rubberizing mixture of the invention is provided to the generally metallic bracing plies. A tire which has a belt with the mixture of the invention as belt rubber mix and which is constructed and vulcanized by conventional processes features very good belt durability.

As an alternative or in parallel with this, the rubberizing mixture can be provided to a carcass. It is preferable that this is the steel cord carcass of a tire for a commercial vehicle.

DESCRIPTION OF THE PREFERRED EMBODIMENTS OF THE INVENTION

The invention will now be explained in more detail with reference to a comparative example and to an inventive example, these being summarized in Table 1.

In all of the mixture examples in the tables, the stated quantitative data are parts by weight, based on 100 parts by weight of all rubber (phr). comp denotes the comparative mixture, and I denotes the rubberizing mixture of the invention. The mixture comp(1) is a rubberizing mixture for the belt with a conventional silica: Ultrasil® VN3 (Evonik Industries). The mixture comp(2) comprises a high-dispersibility silica with a CTAB index of less than 130 m$^2$/g (Zeosil® 1115 MP from Rhodia). The mixture I(3) comprises, in contrast, a high-dispersibility silica with a CTAB index of more than 130 m$^2$/g (Zeosil® 1165 MP from Rhodia).

The mixture was produced under conventional conditions in a plurality of stages in a laboratory tangential mixer. Test specimens were produced from all of the mixtures via 20 minutes of vulcanization under pressure at 160° C., and properties typical in the rubber industry were determined on the materials by the test methods stated below.

Shore A hardness at room temperature in accordance with DIN 53 505

Rebound resilience at room temperature in accordance with DIN 53 512

Tensile strength at room temperature in accordance with DIN 53 504

Elongation at break at room temperature in accordance with DIN 53 504

Modulus at 50 and 300% elongation at room temperature in accordance with DIN 53 504

Fracture energy density determined in the tensile test in accordance with DIN 53 504, where the fracture energy density is the required fracture energy divided by the volume of the specimen Loss factor tan $\delta_{max}$ at 55° C. as maximal value over the elongation sweep from dynamic-mechanical measurement in accordance with DIN 53 513

The mixtures were also characterized in relation to their dynamic durability with the aid of a "tear fatigue analyzer" (TFA). Typical test procedures are described by way of example in Kautschuk Gummi Kunststoffe 45 (12), 1064 ff (1992). The present results were achieved with a pulse loading of 30/5 Hz and with dynamic elongations of from 5 to 8%. The evaluation determined the possible energy introduced for a lifetime of 100 kcycles.

385/65 R22.5 commercial-vehicle tires with a four-ply steel belt were moreover produced with the mixtures comp (1), comp(2) and I(3) as rubberizing mixtures for the 2nd and 3rd belt ply, and tested at a constant ambient temperature of 38° C. on an in-house test rig. The typical test procedure includes a load increase in stages until the tire fails.

TABLE 1

|  | Unit | comp(1) | comp(2) | I(3) |
| --- | --- | --- | --- | --- |
| Constituents |  |  |  |  |
| Natural rubber | phr | 80 | 80 | 80 |
| Polybutadiene[a] | phr | 20 | 20 | 20 |
| Silica A[b] | phr | 55 | — | — |
| Silica B[c] | phr | — | 55 | — |
| Silica C[d] | phr | — | — | 55 |
| Silane coupling agent[e] | phr | 8.5 | 8.5 | 8.5 |
| Processing aids | phr | 5 | 5 | 5 |
| Antioxidant | phr | 4 | 4 | 4 |
| Organic cobalt salt | phr | 0.4 | 0.4 | 0.4 |
| Resin made of resorcinol and formaldehyde donor | phr | 5 | 5 | 5 |
| Zinc oxide | phr | 8 | 8 | 8 |
| Accelerator | phr | 1.5 | 1.5 | 1.5 |
| Sulfur | phr | 4.0 | 4.0 | 4.0 |
| Properties |  |  |  |  |
| Shore A hardness at RT | Shore A | 77 | 79 | 78 |
| Rebound resilience at RT | % | 46 | 45 | 44 |
| Tensile strength at RT | MPa | 21 | 17 | 21 |
| Elongation at break at RT | % | 452 | 364 | 465 |
| 50% modulus | MPa | 2.2 | 2.4 | 2.2 |
| 300% modulus | MPa | 14.2 | 15.2 | 14.2 |
| Fracture energy density | J/cm³ | 40 | 27 | 42 |
| tan $\delta_{max}$ at 55° C. | — | 0.121 | 0.135 | 0.135 |
| TFA energy for 100 kilocycles | kPa | 82 | 90 | 96 |
| Drum running time to failure | h | 135 | 183 | 194 |

[a]high-cis polybutadiene
[b]Ultrasil ® VN3, CTAB index = 165 m²/g, Evonik Industries, Germany
[c]Zeosil ® 1115 MP, CTAB index = 105 m²/g, Rhodia, Germany
[d]Zeosil ® 1165 MP, CTAB index = 155 m²/g, Rhodia, Germany
[e]Silane coupling agent on carbon black in a ratio by weight of 1:1, X 50 S ®, Evonik Industries, Germany From Table 1 it can be seen that, in comparison with a mixture using a conventional silica, crack growth can be reduced by using a high-dispersibility silica with a CTAB index of 155 m²/g, while the other properties of the mixture remain at a similar level. The use of this type of mixture around the belt region of a tire brings about a marked increase in lifetime.

It is understood that the foregoing description is that of the preferred embodiments of the invention and that various changes and modifications may be made thereto without departing from the spirit and scope of the invention as defined in the appended claims.

What is claimed is:

1. A sulfur-crosslinkable rubberizing mixture for metallic reinforcement in pneumatic tires, comprising:
    from 70 to 100 phr (parts by weight, based on 100 parts by weight of all of the rubbers in the mixture) of natural rubber;
    from 0 to 30 phr of at least one polybutadiene;
    from 0 to 15 phr of at least one carbon black;
    from 20 to 100 phr of at least one high-dispersibility silica;
    at least one silane coupling agent; and,
    an adhesive system including an organic cobalt salt, a reinforcing resin, and more than 2.5 phr of sulfur,
    wherein the CTAB index of the high-dispersibility silica in accordance with ASTM D3765 is more than 130 m²/g.

2. The rubberizing mixture as claimed in claim 1, wherein the at least one polybutadiene is a polybutadiene having more than 95% by weight cis content or a functionalized Li-polybutadiene.

3. The rubberizing mixture as claimed in claim 1, comprising from 40 to 80 phr of the at least one high-dispersibility silica.

4. A rubber-reinforcement composite comprising:
    the rubberizing mixture as claimed in claim 1; and,
    a metallic reinforcement.

5. The rubberizing mixture as claimed in claim 4, wherein the adhesive system comprises 0.2 to 2 phr of the organic cobalt salt.

6. The rubberizing mixture as claimed in claim 1, comprising less than 15 phr of processing aids.

7. A pneumatic tire comprising a sulfur-crosslinked rubberizing mixture as claimed in claim 1.

8. The pneumatic tire as claimed in claim 7, wherein a belt-rubber mix is made of the sulfur-crosslinked rubberizing mixture.

9. The pneumatic tire as claimed in claim 7, wherein a carcass-rubber mix is made of the sulfur-crosslinked rubberizing mixture.

10. The pneumatic tire as claimed in claim 9, wherein the pneumatic tire is a tire for a commercial vehicle.

* * * * *